Patented July 19, 1938

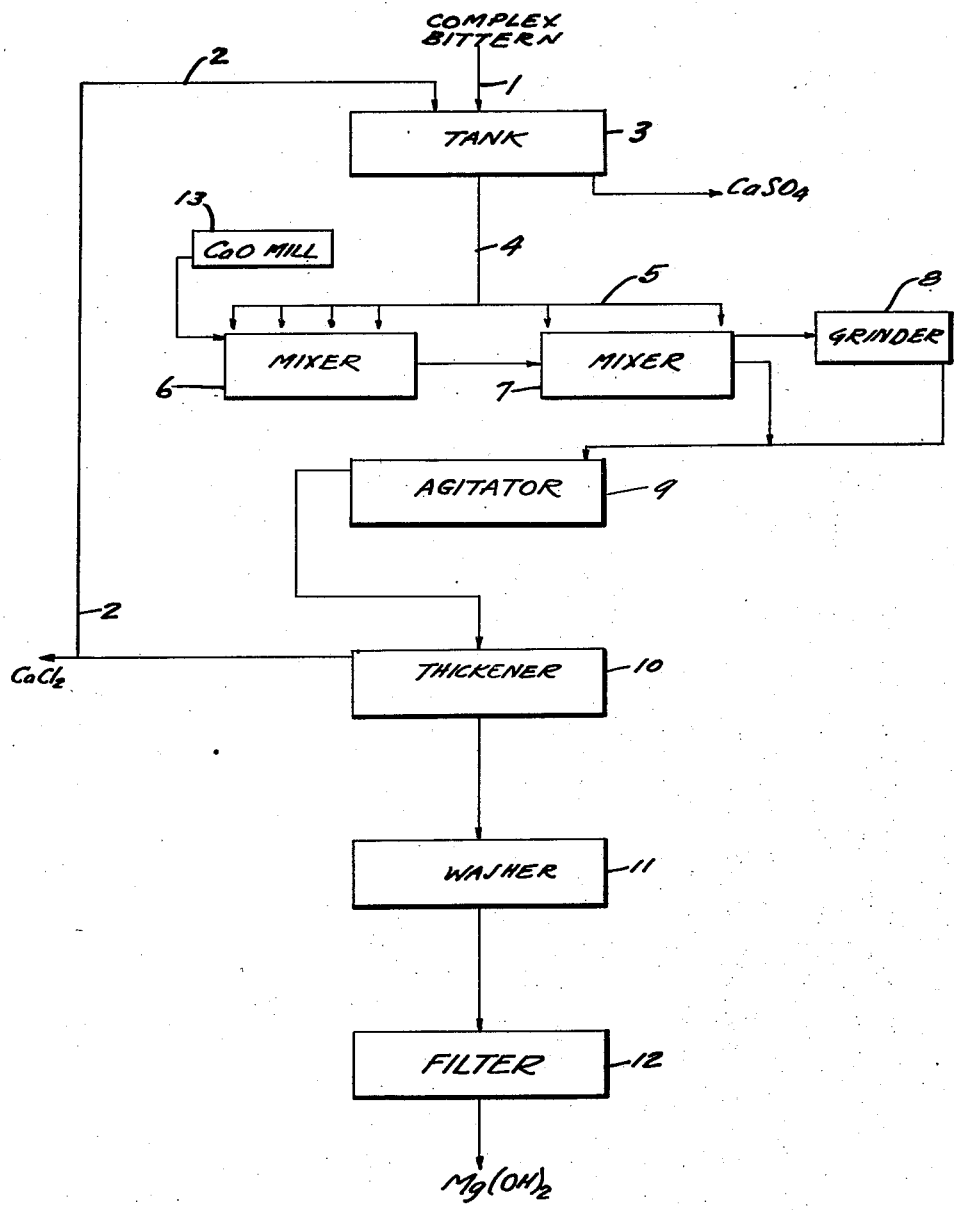

2,124,002

UNITED STATES PATENT OFFICE 2,124,002

PROCESS FOR MANUFACTURING MAGNESIUM HYDROXIDE

Marion G. Mastin, Graceland Park, Redwood City, Calif., assignor, by mesne assignments, to Westvaco Chlorine Products Corporation, New York, N. Y., a corporation of Delaware Application December 26, 1933, Serial No. 703,936

2 Claims. (Cl. 23—201)

This invention or discovery relates to the manufacture of magnesium hydroxide; and it comprises a method of recovering magnesia in a readily settling and filtering form from bitterns containing NaCl and $MgCl_2$ wherein granulated quicklime is subjected to the action of warm bittern added thereto in consecutive small portions until the lime is completely replaced by magnesia; all as more fully hereinafter set forth and as claimed.

Bitterns are mother liquors left after evaporation of sea water or brines for the recovery of common salt and they are often of rather complex constitution. They always contain residual NaCl and more or less magnesium as the chloride or the sulphate, or as both. Many other salines, not here important, are usually present in less amount.

In another and copending application of one Seaton, Serial No. 703,934, is described and claimed a method of recovering hydrated magnesia from brines and saline solutions rich in magnesium in a form readily settled, filtered and washed, wherein recovery is effected by the use of granulated quicklime; the granular size being advantageously such that all will pass a 20 mesh sieve and 50 per cent or so will remain on a 100 mesh. Dust should be absent. The quicklime of the granules is gradually and completely converted, hydrated magnesia being produced in a granular, readily handled form. The magnesia recovered is pure, containing only the impurities of the lime used. In the particular way of operating used, the granulated lime and the brines are stirred together.

With bitterns, I have found better results are obtained by a modification of this process wherein the granulated quicklime and the bittern are brought into reaction in a methodical manner. I have found, as the result of an extensive investigation, that a fast settling precipitate, one settling at the rate of about six feet per hour, which can be filtered rapidly, is secured from a complex bittern if the bittern is added to the quicklime slowly and in degrees so that instead of a watery slurry, a plastic but mush-like magma is formed at first, while further bittern addition is so regulated that this mush-like consistency is maintained during the first stages of operation, additions being in successive small increments. During this operation, the CaO of the quicklime fragments is progressively converted into hydrated magnesia. During the operation, disintegrating agitation should be avoided.

It is generally the object of the present invention to provide a commercially practical process for the manufacture of magnesium hydroxide which can be readily settled and filtered. The invention possesses numerous other advantageous objects and features which will appear in the following wherein a process illustrative of the invention has been disclosed.

In the accompanying drawing, I have diagrammed a preferred flow-sheet of my process in which I have successfully treated a bittern of about 30 per cent saline concentration having the following approximate composition:

|  | Per cent |
|---|---|
| $MgCl_2$ | 7.5 |
| $MgSO_4$ | 5. |
| KCl | 1.25 |
| NaCl | 14. |

The bittern contains magnesium sulfate which it is desirable to convert, as a preliminary operation, into magnesium chloride. This is done with recycled calcium chloride solution from a later operation. The bittern, delivered from line 1, is treated with a calcium chloride solution, from line 2, in tank 3, calcium sulphate being removed from the tank. The sulphate free bittern is drawn out through line 4 to a header 5 to deliver the bittern at a plurality of points in mixers 6 and 7.

Granulated quicklime is delivered from grinder 13 to mixer 6, the lime being granulated so that it will pass a twenty-mesh screen while about 50 per cent will remain on a one hundred-mesh screen and include a minimum of dust. The quicklime is of a high grade but is burned at a high temperature so as to slake slowly.

To the granulated quicklime the bittern is added portionwise in successive small increments. The first portions added give a considerable development of heat and the mixture steams freely. It is advantageous that the bittern be initially warm, say, at 50° to 60° C. The amount of bittern added to the granulated quicklime is such that the fluent mass is plastic and cream-like rather than like a slurry, only about one-fourth of the bittern necessary to react with the quicklime being added in mixer 6 and the remainder in mixer 7. Bittern is added progressively as the mixture proceeds through mixer 6 to maintain a plastic consistency, liquid being supplied only as fast as it is withdrawn by reaction with the quicklime so that solution of $Ca(OH)_2$ is avoided and dilution to a thin slurry before hydration is nearly complete is avoided. Usually about 90 per cent of the lime in mixer 6 has hydrated and about 25 per cent has reacted with the magnesium salt when it leaves the mixer. Some 10 per cent of the CaO remains as such at this time.

The mass passing out of mixer 7 is graded as to size and any coarse particles are reground in grinder 8 and then added to the slurry in the holdback agitator 9. In this agitator the mixture is gently rolled and kept in suspension. However, the agitation is very gentle, and in all phases of the process extreme agitation is avoided, diaphragm pumps, for instance, being used instead of centrifugal pumps, to avoid churning. The mixture takes about one hour to pass through agitator 9 after which it passes to thickener 10. During this hour, the reaction between the lime and magnesium compounds present in the bittern proceed to completion. The total time for the passage through mixers 6 and 7 and agitator 9 is about an hour and one-half.

In the thickener 10, the magnesium hydroxide is concentrated by settling and the calcium chloride solution removed, a portion being drawn off through the line 2 for backcycling; for use in removing sulphates. The magnesium hydroxide is then washed in washer 11 with carbonate and carbon dioxide free water and then filtered in filter 12.

The process is generally operated with a final excess of bittern, that is, with a mother liquor containing magnesium salts. Any excess of lime is apt to give fine magnesia and it is desirable that all the hydrated magnesia produced go to a spongy material which settles and filters relatively readily. In so operating, that is, with an excess of bittern, the pH remains that of the bittern which, in practice, is often about 11.7. With any lime going into solution, the pH will rise about a point higher. Formation of the magnesia at the ordinary pH of bittern is advantageous.

The process is applicable to solutions containing magnesium salts whether or not the term "bittern" properly applies and the term "complex bittern" is used herein as including any suitable solution containing a soluble magnesium halide, usually the chloride, and usually, though not necessarily, other salts as calcium and sodium chlorides, irrespective of its origin and whether or not it is a true bittern.

In practice, it is preferable that the bittern contain at least 5 per cent $MgCl_2$ since below this the character of the precipitate is less satisfactory. Instead of quicklime, dolomitic materials can be used after burning to the oxide and the term "quicklime" is intended to include these.

I claim:

1. A method of producing hydrated magnesia in a readily settling and filtering form, from magnesian bitterns containing NaCl and $MgCl_2$, by reaction between quicklime and the $MgCl_2$, which comprises gradually admixing, with a charge of granulated quicklime, an amount of bittern carrying water sufficient for substantially complete slaking of the lime and containing $MgCl_2$ in amount about a quarter of the total amount required for converting the lime to magnesia, the rate of admixture being such as to maintain the mixture as a hot plastic steaming mass, agitating the mixture until the lime is substantially completely hydrated, then gradually adding more bittern to the plastic mass with agitation, in amount sufficient to convert the rest of the quicklime and form a thin slurry containing spongy hydrated magnesia, and recovering the magnesia from the slurry.

2. A method of producing hydrated magnesia in a readily settling and filtering form, from magnesian bitterns containing NaCl and $MgCl_2$, by reaction between quicklime and the $MgCl_2$, which comprises gradually admixing, with a charge of granulated quicklime, an amount of bittern carrying water sufficient for substantially complete slaking of the lime and containing $MgCl_2$ in amount about a quarter of the total amount required for converting the lime to magnesia, the rate of admixture being such as to maintain the mixture as a hot plastic steaming mass, agitating the mass until the lime is substantially completely hydrated, then gradually adding more bittern to the plastic mass with agitation, in amount sufficient for conversion of the rest of the quicklime and to form a thin slurry containing spongy hydrated magnesia, continuing gentle agitation of the slurry after the addition of said bittern to insure completion of the conversion of the quicklime, and recovering the hydrated magnesia from the slurry.

MARION G. MASTIN.